Oct. 18, 1966 R. D. VILLWOCK 3,280,309

LOGARITHMIC PULSE COUNTER

Filed June 28, 1963 2 Sheets-Sheet 1

ROBERT D. VILLWOCK
INVENTOR.

BY Allen E. Botney

ATTORNEY

ROBERT D. VILLWOCK
INVENTOR.
BY Allen E. Botney
ATTORNEY 3,280,309

LOGARITHMIC PULSE COUNTER

Robert D. Villwock, Glendora, Calif., assignor to Electro-Optical Systems, Inc., Pasadena, Calif.

Filed June 28, 1963, Ser. No. 291,455
5 Claims. (Cl. 235—92)

The present invention relates to pulse counters in general and more particularly relates to a pulse counter which yields a digital output equal to the logarithm of the number of pulses counted.

The present invention has a host of different uses. One obvious use is in the data processing or computer field where it may be desirable to obtain the logarithm of a number represented in binary-coded form. Still another use would be in the field of communications, for example, in telemetry, since the logarithm of a number is smaller than the number itself so that fewer bits are required to transmit the digital data. Again, by using suitable additional circuitry, it can be employed as a log-rate counter. As a further practical application, it could also be combined with suitable analog devices to yield a logarithmic converter of high precision.

It is, therefore, an object of the present invention to provide an electronic network that will count the number of pulses applied to it and, in response thereto, produce a digital output equal to the logarithm of the number of pulses counted.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
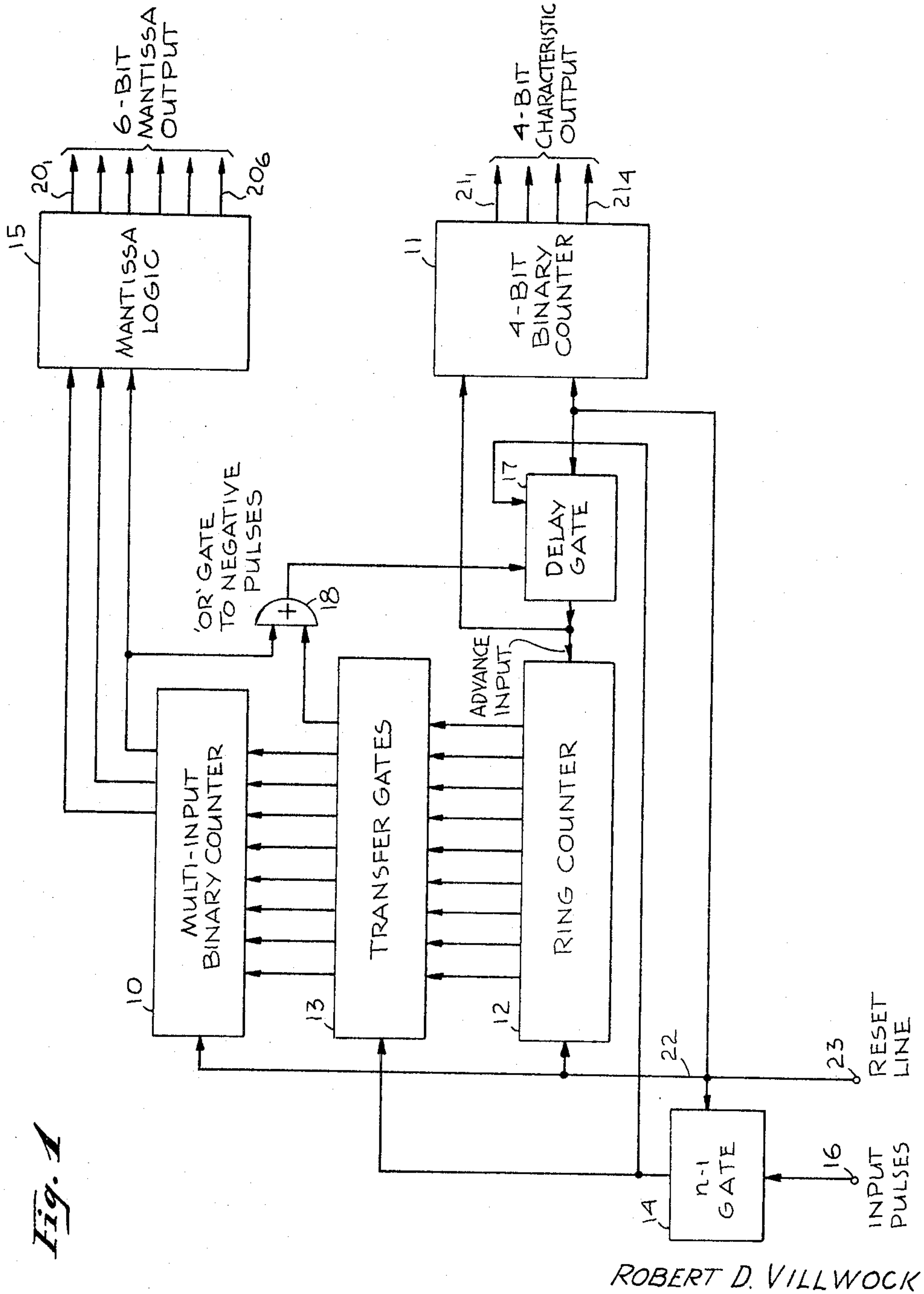
Figure 2:
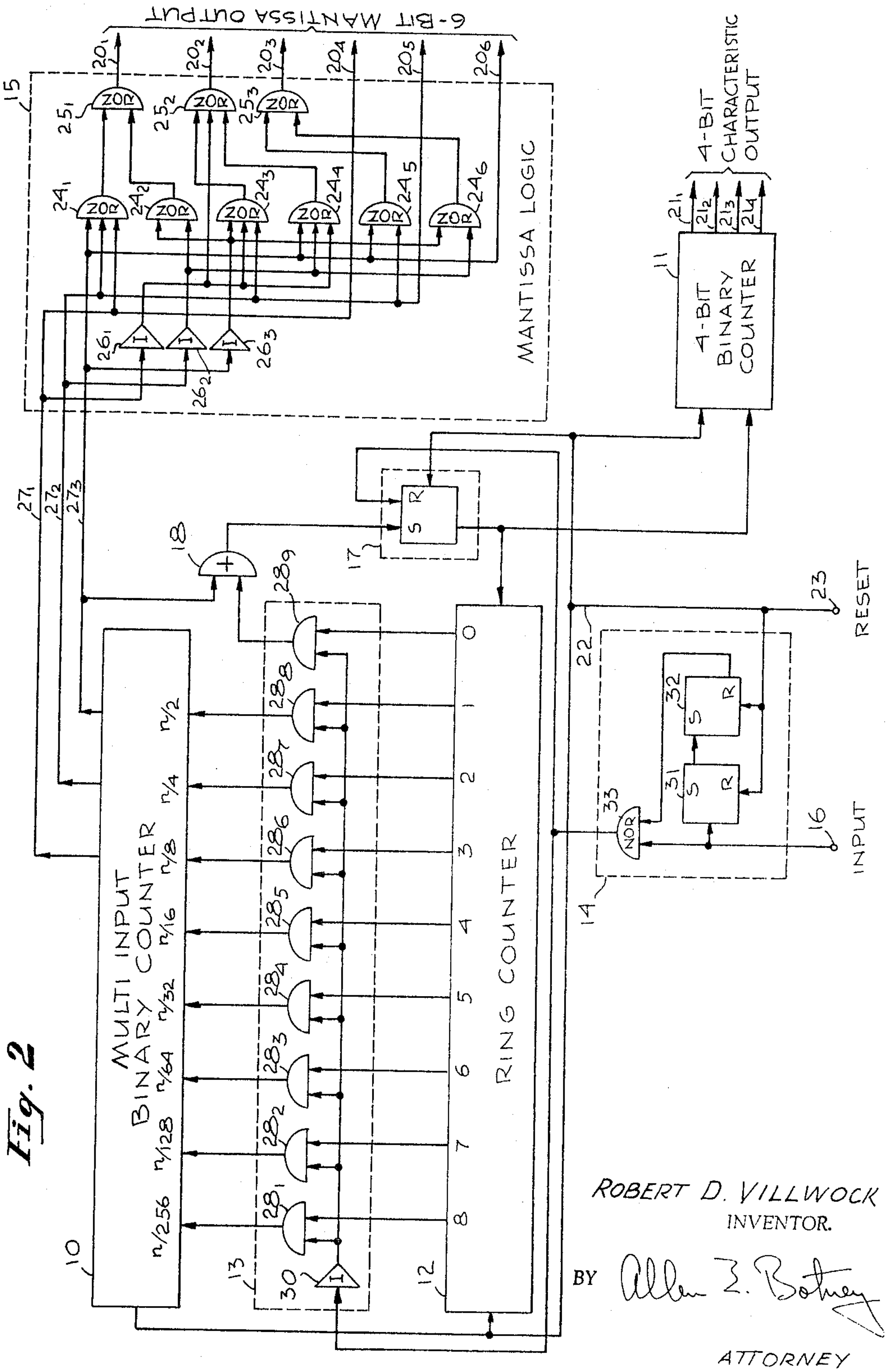

FIGURE 1 is a block diagram of a preferred embodiment of the present invention; and FIGURE 2 is a repeat of the FIG. 1 diagram but arranged to show some of the basic units thereof in greater detail.

For a consideration of the invention in detail, reference is now made to the drawings wherein like or similar parts or elements are given like or similar designations in the several figures. In FIG. 1, an embodiment of the present invention is shown to basically include a multi-input binary counter 10, a single input binary counter 11, a ring counter 12, a transfer gate 13, a $(N-1)$ gate 14, and a mantissa logic network 15. $(N-1)$ gate 14 is connected between transfer gate 13 and a pulse input terminal 16, the output end of gate 14 also being connected to one of three inputs to a delay gate 17. Beside the input from gate 14, transfer gate 13 has nine additional input lines, all of which come from ring counter 12, and nine output lines as well, eight of these output lines being connected to multi-input binary counter 10 and the ninth such line being connected as one of two inputs to an OR gate 18. Binary counter 10 also has three output lines which are connected as inputs to mantissa logic network 15 which, in the embodiment shown, is a six-bit mantissa output, which means that network 15 has six output lines designated $20_1$–$20_6$.

As shown in the figure, one of the lines interconnecting binary counter 10 and mantissa logic network 15 is tapped for connection as a second input to OR gate 18 whose output, in turn, constitutes a second input to delay gate 17. As for the delay gate, its output is fed both to ring counter 12 and to single input binary counter 11 whose four output lines are designated $21_1$–$21_4$. Finally, binary counter 10, binary counter 11, ring counter 12, gate 14 and gate 17 are all connected to a reset line 22 by means of which reset pulses are applied to them, the reset pulses being fed to line 22 via a reset input terminal 23.

Considering the features of each of the above said basic units in somewhat greater detail, mantissa logic network 15 accepts a binary-coded input and delivers a binary-coded output corresponding to the logarithm of the input. The mantissa logic network in the system illustrated in FIG. 1 accepts a three-bit input. However, this is illustrative only, and it is possible to employ a mantissa logic network to accept any number of input bits. The resolution of the system depends upon two things. One is the aforementioned number of mantissa logic input bits and the other is the number of mantissa logic output bits, both of which may be increased or decreased at will. Therefore, the resolution of the system can be made as fine as is desired. The three-bit input shown in FIG. 1 has an input resolution of one part in 16, a four-bit input would have an input resolution of one part in 32, five-bits would have one in 64, etc. The number of output bits, as stated earlier, can be made as large as desired. However, the resolution is limited by the lower of the two. Accordingly, the number of output bits is selected to be somewhat larger than the input since it is preferable that the number of input bits determine the resolution.

For the purpose of concisely illustrating the function of the mantissa logic network, reference is now made to the following table:

| Input | Output | Decimal Equivalents | N Decimal Form | $\log_2 N$ Decimal Form |
|---|---|---|---|---|
| $2^2\ 2^1\ 2^0$ | $2^{-1}\ 2^{-2}\ 2^{-3}\ 2^{-4}\ 2^{-5}\ 2^{-6}$ | | | |
| 000 | 000000 | 0.000 | 1.000 | 0.000 |
| 001 | 001011 | 0.172 | 1.125 | 0.170 |
| 010 | 010101 | 0.328 | 1.250 | 0.322 |
| 011 | 011101 | 0.453 | 1.375 | 0.460 |
| 100 | 100101 | 0.578 | 1.500 | 0.585 |
| 101 | 101101 | 0.703 | 1.625 | 0.701 |
| 110 | 110100 | 0.812 | 1.750 | 0.803 |
| 111 | 111010 | 0.906 | 1.875 | 0.908 |

wherein the first column is the binary-coded input where $2^2$ represents the most significant figure. Column 2 in the table shows the six-bit output of the mantissa logic circuitry. The third column shows the decimal equivalent of the output. It can be seen that the logic output is approximately the logarithm to the base 2 of the number N shown in the fourth column. The fifth column gives the correct value of the logarithm to three significant figures. Comparison of columns 3 and 5 shows that the poorest resolution is for $N=1.250$. The resolution of this output is one part in 53. All other outputs have better resolution going as high as one part in 450 for $N=1.875$. Since the resolution of a three-bit input is only one part in 16, the output resolution is more than adequate. The logic of the mantissa circuitry, then, is such that for a binary input of zero the output is the binary form of $\log_2 1.000$. When the input is 1, the output is $\log_2 1.125$. When the input is 2, the output is $\log_2 1.250$, etc., on up to an input of 7 and an output of $\log_2 1.875$. In other words, the network can deliver eight different outputs equal to the logarithm of the numbers from 1 to 1.875 in 0.125 increments. The output of this network will be utilized as the mantissa of the logarithm output and it is for this reason that the network is called the mantissa logic.

For a more detailed view of mantissa logic network 15, reference is made to FIG. 2 wherein the network logic is shown to include two rows of NOR gates, a first row of six such gates being designated $24_1$–$24_6$ and a second row of three such gates being designated $25_1$–$25_3$. Also included in the network are three driver amplifiers or inverters designated $26_1$–$26_3$ which are connected between the NOR gates and the three input lines to the network which are respectively designated $27_1$–$27_3$. More specifically, input line $27_1$ is connected to one of three inputs to NOR gate $24_1$ and is also connected directly to network output line $20_4$. In addition, input line $27_1$ is connected to inverter $26_1$ whose output end, in turn, is connected to one of three inputs to NOR gates $24_3$, $24_4$ and $25_2$. Input line $27_2$, on the other hand, is connected to the inputs of NOR gates $24_1$, $24_3$ and $24_5$ and is also directly connected to network output line $20_5$. Furthermore, like line $27_1$, input line $27_2$ is connected through inverter $26_2$ to NOR gates $24_2$, $24_4$ and $24_6$. Finally, input line $27_3$ is connected to the inputs of NOR gates $24_1$, $24_4$ and $24_5$ and, like the others, is connected directly to network output line $20_6$. As for inverter $26_3$, its output end is connected to the inputs of NOR gates $24_2$, $24_3$ and $24_6$. As for the second row of NOR gates, namely, gates $25_1$–$25_3$, the two inputs to gate $25_1$ are respectively connected to receive the outputs from NOR gates $24_1$ and $24_2$, the remaining two inputs to gate $25_2$ are respectively connected to receive the outputs from NOR gates $24_3$ and $24_4$, and the two inputs to gate $25_3$ are respectively connected to receive the outputs from NOR gates $24_5$ and $24_6$. The output ends of NOR gates $25_1$–$25_3$ are respectively connected to output lines $20_1$–$20_3$.

Multi-input binary counter 10 is a conventional counter with the input of each stage made accessible for pulse injection. the output of the very last stage can be equal to the number of input pulses, N, divided by 2, 4, 8, 16, etc., depending upon where the input pulses are injected. For the system shown in FIG. 1, the multi-input counter has eight stages and, consequently, eight inputs marked N/256, N/128, N/64, N/32, N/16, N/8, N/4 and N/2. For the three-bit input mantissa logic just described, the last three stages of the counter, which are connected to lines $27_1$–$27_3$, are utilized, the last stage on line $27_3$ feeding the $2^2$ or most significant figure input. Thus, the three-bit binary-coded output of the counter supplies the eight possible inputs to the mantissa logic.

If pulses are injected at the input of the third from the last stage (the N/8 input), the three-bit output will be the binary form of the number of input pulses from 0 to 7. That is, initially, the counter is reset and has an output of 000. The arrival of the first input pulse at the N/8 input changes the output to 001. The second pulse changes the output to 010, and so on, until the seventh pulse, which shows an output of 111. On the other hand, if pulses are injected at the N/16 input, the number of pulses reaching the N/8 input will be one-half the number of input pulses. The output of the counter will, therefore, step from 0 to 7 as before, but will step once for each two input pulses, i.e., it will require 14 input pulses to step the output to the count of 7.

Similarly, if the input pulses are injected at the N/32 input, the output will step once for each four input pulses. Input pulses injected at the N/64 input will step the output once for each eight input pulses, etc. It can thus be seen that when pulses are applied at the N/8 input, the output follows the input, i.e., the output shows the number of input pulses from 0 to 7 and recycles on 8. It can also be seen that when pulses are applied at the N/16 input, the output shows a number equal to one-half the number of pulses injected. Likewise, when pulses are injected at the N/32 input, the output shows one-fourth the number of input pulses. Hence, it can be seen that the counter is capable of multiplying the number of input pulses by one, one-half, one-quarter, one-eighth, one-sixteenth, or one-thirty-second, depending on the injection point. If pulses are injected at the N/4 input, the first pulse advances the output number from 000 to 010 or from 0 to 2. The second pulse advances the output to 100 or 4. The third pulse advances the output to 110 or 6. The fourth pulse advances the output to 000 once again. In this case, therfore, the output is equal to the number of input pulses multiplied by two. Again, if pulses are injected at the N/2 input, the output will increase from 000 to 100 or 4 and then back again to 000 with the application of the next pulse. Accordingly, the output in this instance is equal to the number of input pulses multiplied by 4.

Summarizing then, the muplti-input binary counter has 8 inputs and a three-bit binary output. The output number presented is equal to the number of input pulses multiplied by either 1/32, 1/16, 1/8, 1/4, 1/2, 1, 2 or 4, depending upon which one of the eight inputs the pulses are fed to. In addition, each time the counter returns to the 0 count, a carry pulse is produced at the $2^2$ output lead, that is, at the lead out of the last stage in the counter.

Ring counter 12 has one input and nine outputs numbered from 0 to 8 as is shown in FIG. 1. In its reset condition, output number 0 has a false or down potential on it, while all other outputs are true or at a high potential. However, the arrival of an input pulse causes the false signal to shift to output number 1, while all other outputs, including the 0 output, are true. The second input pulse causes the false output to shift to output line number 2, etc., until the false output reaches output line number 8, at which point the false output returns to output number 0 with the next pulse. Summarizing, only one of the nine outputs is false and all others are true. Initially, when the ring counter is reset, the false output is on the 0 output line. However, as input pulses are applied, the false signal shifts from one output lead to the next. Accordingly, at any one time, the number of the false output lead is equal to the number of input pulses to the ring counter.

Transfer gate 13 has one pulse input, nine steering inputs and nine steered outputs. The operation of the transfer gate is such that input pulses emerge from any of the nine outputs depending upon which steering inputs are commanded. More specifically, as is shown in FIG. 2, the transfer gate is composed of nine AND gates designated $28_1$–$28_9$. As is also shown therein, the transfer gate further includes a driver amplifier or inverter 30, which is connected at its input end to $(N-1)$ gate 14 and at its output end to one of the two inputs to each of the AND gates. If the other input of any of the AND gates is false (or down), a negative going output pulse will occur. The output of each AND gate is normally in a true or high potential state. As shown, the nine steering input leads of the transfer gate are connected to the nine outputs of the ring counter. Remembering that only one output at a time from the ring counter is false and all others are true, it can be seen that pulses fed into the transfer gate will emerge on only one of the output leads. Moreover, this output lead is determined by the ring counter. The ring counter, then, in conjunction with the transfer gate, serves to channel input pulses to any of nine output lines.

Referring again to the figures, it can be seen that if the ring counter has received four input pulses, then any input pulses entering the transfer gate will be directed to the N/16 input of the multi-input binary counter. However, if the ring counter has been pulsed seven times, then pulses into the transfer gate will be injected into the N/128 input of the binary counter. Remembering also that the output binary-coded number of counter 10 is equal to the number of input pulses multiplied by some constant, which is determined by the input injection point, it can be seen that the ring counter controls the multiplier applied to the input pulses. In this regard, each time the output of the counter returns to 0, a carry pulse is produced as was previously mentioned. This carry pulse, in reality, corresponds to the count of eight. In other words, if pulses are injected into the N/8 input, or unity multiplier input, the output steps up to 7 and the eighth pulse returns the output to 0 and sends out a carry pulse.

A pulse fed into the N/2 input causes the output to step to 4. A second pulse returns the output to 0 and sends a carry pulse. Thus, every time a carry pulse is received by the ring counter, it means that the number of input pulses multiplied by the injection point constant has reached 8.

The 0 output lead of the ring counter controls the 0 output lead of the transfer gate. This output, namely, the output from AND gate $\mathbf{28_9}$, is paralleled with the carry line, line $\mathbf{27_3}$, from the counter. Thus, if the ring counter is in its reset condition, a pulse entering the transfer gate will emerge directly on the carry line. Therefore, when the ring counter is in its "home" or reset position, the number of input pulses to the transfer gate are effectively multiplied by 8, this being so because a carry pulse signifies a count of 8.

Summarizing now the details of the binary counter, ring counter and transfer gate taken together, it is seen that the counter has a three-bit binary-coded output plus a carry line. The three-bit output can present a number from 0 to 7 and a pulse on the carry line corresponds to the number 8. The ring counter has nine positions, including its home or reset position. The output number displayed by the binary counter, plus the carry line, is equal to the number of pulses fed to the transfer gate multiplied by 8, 4, 2, 1, ½, ¼, ⅛, 1/16 or 1/32 according to whether the number of pulses received by the ring counter is 0, 1, 2, 3, 4, 5, 6, 7 or 8, respectively. As an example, if the ring counter has been pulsed twice, the output of the binary counter will be equal to the number of pulses into the transfer gate multiplied by two. If the ring counter has been pulsed six times, the output of the counter will then be equal to ⅛ the number of pulses into the transfer gate, and so on. Thus, we essentially have two inputs and one output. The output is a binary-coded number plus a carry line. One input receives pulses while the other controls the multiplier that operates on the input pulses.

Binary counter 11 is a conventional binary counter and for the system being described has four output bits. A conventional four-bit binary coded number is its output, which is equal to the number of input pulses received since reset. The output from this counter will be used herein as the binary-coded form of the logarithm's characteristic.

$(N-1)$ gate 14 has a single input and single output. The function of this gate is such that the number of output pulses is equal to the number of input pulses, less 1. Initially, when reset, the application of the first pulse produces no output. However, the second and all following input pulses do produce output pulses. Beyond the first pulse, then, the gate appears in the circuit simply as an inverter until reset again. A more detailed showing of gate 14 is presented in FIG. 2 wherein it is shown to include a pair of flip-flops 31 and 32 and a NOR gate 33. Input terminal 16 is connected to flip-flop 31 whose output is fed to flip-flop 32. Terminal 16 is also connected to one of two inputs to NOR gate 33 whose other input is connected to the output end of flip-flop 32. In addition, reset terminal 23 is connected to both flip-flops. Finally, as is shown in FIG. 2, delay gate 17 is nothing more than a flip-flop circuit which will continue to be designated 17.

The operation of the overall system can best be explained by considering a train of input pulses one at a time. Furthermore, for a much clearer understanding of the operation, reference will be made both to the figures and to the table heretofore presented.

Initially, $(N-1)$ gate 14, ring counter 12, multi-input binary counter 10 and single input binary counter 11 are reset. The output of the multi-input counter is, therefore, 000 and, consequently, the output of mantissa logic 15 is 000000, as shown in the table. From column 4 of said table, this is $\log_2 1.000$. Since the other binary counter, that is, counter 11, is also reset, the characteristic output is 000000. Accordingly, the combined outputs, i.e., the characteristic plus mantissa, initially reads 0000.000000. This, of course, is the logarithm of 1. This is truly a false condition since there are, at this point, 0 input pulses and the $\log_2 0$=minus infinity. If desired, this condition can be indicated but for the system being described, it is desired to begin correct operation after one or more pulses are received.

The arrival of the first input pulse at terminal 16, because of the action of the $(N-1)$ gate, produces no change from the conditions mentioned above, and, hence, the output of the system is still 0000.000000. Since this is the $\log_2 1$ and one pulse has been received, the system is now producing the correct output. The arrival of the second and all following pulses will be passed by $(N-1)$ gate 14. Therefore, for the remainder of the discussion herein, the operation will be considered as though the pulses were applied directly to the input of transfer gate 13. Since ring counter 12 is on its home or reset condition, the pulse will be transferred out the 0 or carry line, that is to say, a pulse will appear at the output of AND gate $\mathbf{28_9}$. This carry line pulse is passed through OR gate 18 for application to delay gate 17 where it is delayed by the flip-flop therein for the width of the pulse. This delay flip-flop feeds both ring counter 12 and characteristic or single-input counter 11. When the input pulse to transfer gage 13 decays, the delay circuit delivers a pulse at its output which advances the ring counter to position number one and also advances the characteristic counter to the count of 1 or 0001. Since the ring counter is advanced on the decay of the input pulse, as previously mentioned, no part of this pulse is transferred to line number 1 therein. Moreover, since multi-input binary counter 10 was not pulsed during this interval, it is still in its reset state so that the mantissa output is still .000000. Thus the output of the system now reads 0001.000000, or in decimal form: 1.000. This is the $\log_2 2$ and since two input pulses have been received the output is therefore correct.

From the preceding it will be remembered that the ring counter is now in position number 1. Consequently, the third input pulse arriving at terminal 16 is transferred to the N/2 input of the multi-input counter. This advances the counter to an output of 100. There is no carry pulse. From the table it can be seen that the output of the mantissa logic is now 100101. It can be also be seen from the table that this is $\log_2 1.5$ in binary form. Since the characteristic output is still 1, which is the $\log_2 2$, the combined outputs from counter 11 and network 15 are $\log_2 2$ plus $\log_2 1.5 = \log_2 2 \times 1.5 = \log_2 3$. Since three input pulses have been received, this is the desired output. With ring counter 12 still in position number 1, the fourth input pulse is transferred to the N/2 input of counter 10. This causes the counter to reset to 000 and produce a carry pulse. As before, the delayed carry pulse advances the ring counter but this time to position number 2 and the binary characteristic counter to the count of 2 or 0010.

The entire output is now 0010.000000, or in decimal form: 2.000. This is the $\log_2 4$, which is again the correct output.

The fifth input pulse is now transferred to the N/4 counter input. This advances the counter to 010 or $\log_2 1.25$. The total system output is now 0010.010101. This $\log_2 4$ plus $\log_2 1.25$ or $\log_2 (4\times 1.25)=\log_2 5$. The sixth pulse advances the counter to 100, or $\log_2 1.5$. The output is then $\log_2 4$ plus $\log_2 1.5$, or $\log_2 6$. The seventh pulse advances the counter to 110 or $\log_2 1.75$. The output is then $\log_2 4$ plus $\log_2 1.75$ or $\log_2 7$. The eighth pulse recycles counter 10 to 000 and sends a carry pulse to OR gate 18. The carry pulse, after delay by gate 17, advances ring counter 12 to the third position and characteristic counter 11 to the count of 3 or 0011. The system output is now: 0011.000000, or in decimal form 3.000, which is $\log_2 8$. The next seven pulses, beginning with pulse number 9, are transferred to the N/8 input of counter 10. Accordingly, counter 10 will step sequentially up to the count of 7. No carry pulse will be produced until the eighth pulse and, therefore, all seven pulses will be injected at the N/8 input, as stated above. Since, during these seven pulses no carry pulses are produced, the characteristic output from counter 11 remains at 0011 or $\log_2 8$. Pulse number 9 then produces a mantissa for $\log_2 1.25$; this, plus the characteristic of $\log_2 8$, yields $\log_2 9$. Pulse number 10 produces $\log_2 1.25$ plus $\log_2 8$ or $\log_2 10$, and so on up to pulse 15, whose mantissa will be $\log_2 1.875$ or a total system output of $\log_2 1.875$ plus $\log_2 8$ or $\log_2 15$. The sixteenth pulse recycles the counter and sends a carry pulse once again. After delay, this carry pulse once again advances the ring counter and characteristic counter, this time to position number 4 and the count of 4 or 0100, respectively. The system output is now 0100.000000 or $\log_2 16$.

From the foregoing, it can be seen that between one and sixteen input pulses, the output was different for each successive pulse. No inaccuracy was introduced as far as the mantissa logic input is concerned. Any inaccuracy of the system throughout this interval is only that of the mantissa logic output resolution. Beyond the count of 16, however, the input resolution remains 1 in 16 and, therefore, higher counts will be subject to this inaccuracy. The next sixteen pulses are injected into the N/16 input. Each two input pulses produce a change in output of the counter. The mantissa cycle is the same as that for the ninth to fifteenth pulses, except that it requires two impulses to effect the same change as a single input pulse did before. After the next fourteen pulses, the output of the counter will be 111 or $\log_2 1.875$. Since the characteristic is still 0100, or $\log_2 16$, the output is equal to $\log_2 (16\times 1.875)$ or $\log_2 30$. The next input pulse produces no change as did every other pulse from number 17 to number 30. However, the next pulse, which is the thirty-second pulse to enter the system, recycles the counter and sends a carry pulse. The characteristic advances, therefore, to 0101, or $\log_2 32$. The next thirty-two pulses are injected into the N/32 input. The output will now change only for every four input pulses. The next sixty-four input pulses are channeled to N/64 input. The output will then change once for every eight input pulses, etc. It can be seen, however, that the overall resolving power of the system remains one part in sixteen for the worst case consideration and for any other conditions the resolution is higher.

Although a particular arrangement of the invention has been illustrated above by way of example, it is not intended that the invention be limited thereto. More specifically, the invention being taught herein is such that the system shown in FIGS. 1 and 2 can be expanded and reiterated to obtain any desired degree of accuracy and counting capacity. Accordingly, the invention should be considered to include any and all modifications, alterations or equivalent arrangements falling within the scope of the annexed claims.

Having thus described the invention, what is claimed is:

1. Logarithmic pulse counter apparatus comprising: a first counter network for presenting an output number in binary-coded form equal to the number of pulses applied to the apparatus multiplied by one of several preselected factors, said network having a first plurality of outputs whereat said output number is presented and a second plurality of inputs to which said pulses are selectively applied, the factor by which the number of input pulses is multiplied depending on which one of the inputs the pulses are fed to; a logic network coupled to receive the binary coded output from said counter network and operable in response thereto to produce a binary-coded output signal that is substantially equal to the mantissa of the logarithm to the base 2 of said output number; and a second counter network to which the pulses are applied and operable in response thereto to produce a binary-coded output signal that is substantially equal to the characteristic of the logarithm to the base 2 of said output number.

2. The apparatus defined in claim 1 wherein said first counter network includes a gating circuit for passing the pulses applied to the apparatus after the first; and means connected between said gating circuit and said first counter network for selectively channeling the pulses passed by said gating circuit to the second plurality of inputs to said first counter network.

3. The apparatus defined in claim 2 wherein said means includes a binary counter having $m$ outputs and $n$ inputs, where $m$ and $n$ are respectively equal to said first plurality of outputs and said second plurality of inputs; a ring counter having $n+1$ output lines; $n+1$ two-terminal AND gates respectively connected at one of their terminals to the $n+1$ output lines of said ring counter, the other terminals thereof being connected to receive the pulses passed by said gating circuit, $n$ of said $n+1$ AND gates having their output ends respectively connected to the $n$ inputs to said binary counter; and a circuit for applying a carry pulse to said ring counter to shift the output from one to another of its output lines, said circuit being connected at its input to the output end of the $(n+1)$th AND gate and to a predetermined one of the $m$ output lines of said binary counter and at its output to said ring counter.

4. The apparatus defined in claim 3 wherein said circuit includes an OR gate connected to receive pulses from said $(n+1)$th AND gate and the predetermined one of said $m$ output lines, and a delay gate connected between said OR gate and said ring counter and operable in response to a pulse from said OR gate for applying a carry pulse to said ring counter at the end of the pulse interval.

5. Logarithmic pulse counter apparatus comprising: gating means for passing the pulses applied to the apparatus after the first; first means having $n$ output lines, where $n$ is an integer greater than 1, said first means normally maintaining $(n-1)$ of its output lines at one potential and the $n$th output line at another potential and being operable in response to carry pulses applied thereto for shifting said other potential from one output line to the next in rotation; second means for presenting an output number in binary-coded form equal to the number of pulses applied to the apparatus multiplied by one of several preselected factors, said second means having $m$ output lines whereat said output number is presented, $m$ being an integer greater than 1 and less than $n$, and $n-1$ input lines to which said pulses are selectively applied, the factor by which the number of input pulses is multiplied depending on which one of the input lines the pulses are feed to; $n$ AND gates respectively connected at their input ends to the $n$ output lines of said first means and also connected to receive the pulses passed by said gating means, $n-1$ of said AND gates respectively being connected at their output ends to the $n-1$ input lines of said second means; a circuit for applying carry pulses to said first means, said circuit being connected to receive the outputs from the $(n+1)$th AND gate and from a predetermined one of the $m$ output lines of said second means; third means connected to receive said carry pulses and operable in response thereto to produce a first binary-coded output signal that is substantially equal to the characteristic of the logarithm to the base 2 of said output number; and fourth means coupled to receive said output number and operable in response thereto to produce a second binary-coded output signal that is substantially equal to the mantissa of the logarithm to the base 2 of said output number.

References Cited by the Examiner

UNITED STATES PATENTS

| | | | |
|---|---|---|---|
| 3,036,774 | 5/1962 | Brinkerhoff | 235—164 |
| 3,099,742 | 7/1963 | Byrne | 235—150 |
| 3,194,951 | 7/1965 | Schaefer | 235—154 |
| 3,226,532 | 12/1965 | Gordon et al. | 235—164 |

MAYNARD R. WILBUR, *Primary Examiner.*

J. F. MILLER, *Assistant Examiner.*